May 16, 1967  A. H. SCHOOLEY ETAL  3,320,503
RADIAL RESISTIVE POLAR COORDINATE DATE TAKEOFF
TRANSMITTER FOR A SERVO CONTROL
Filed May 11, 1955  4 Sheets-Sheet 3
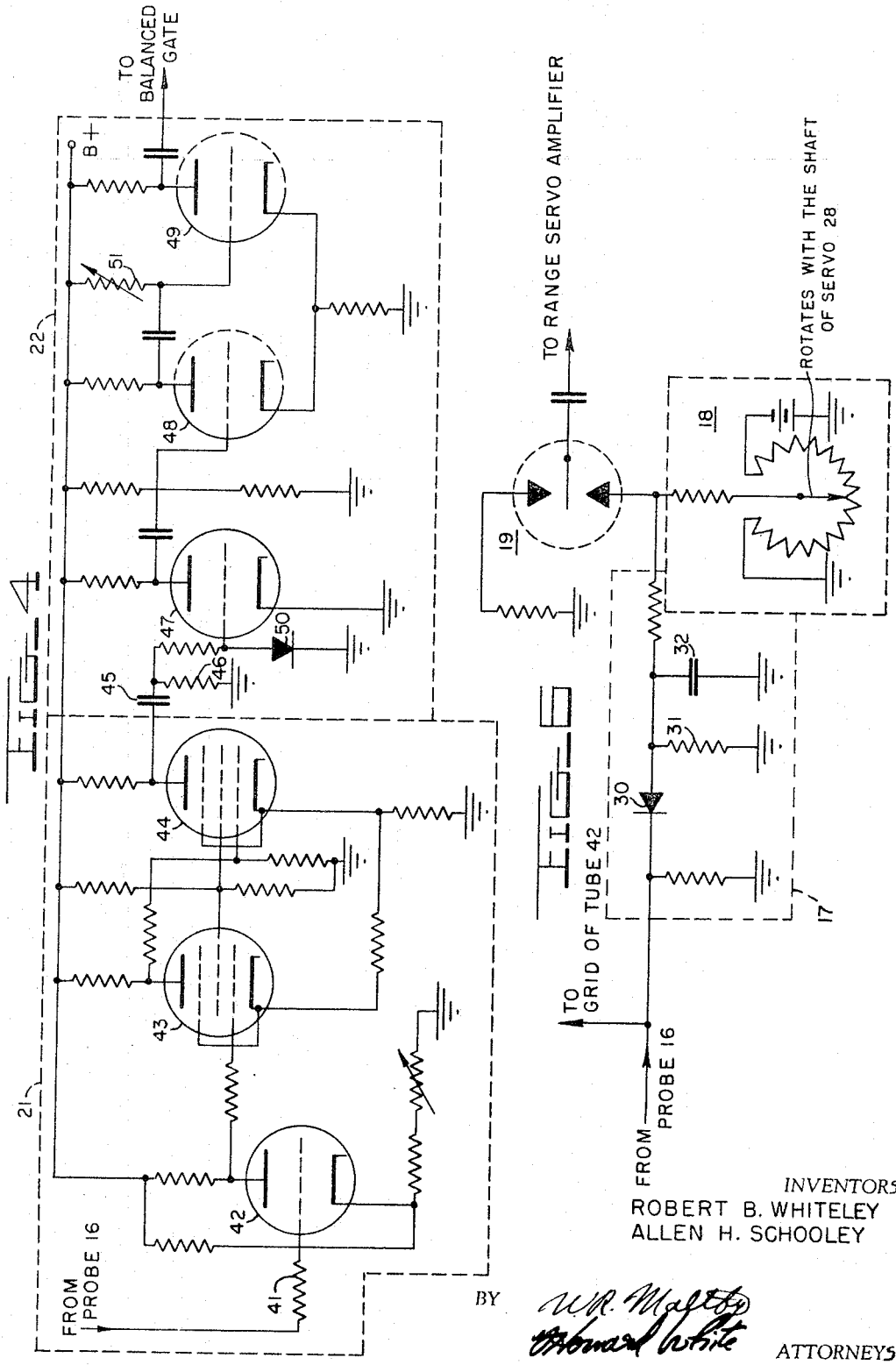
INVENTORS
ROBERT B. WHITELEY
ALLEN H. SCHOOLEY
BY
ATTORNEYS

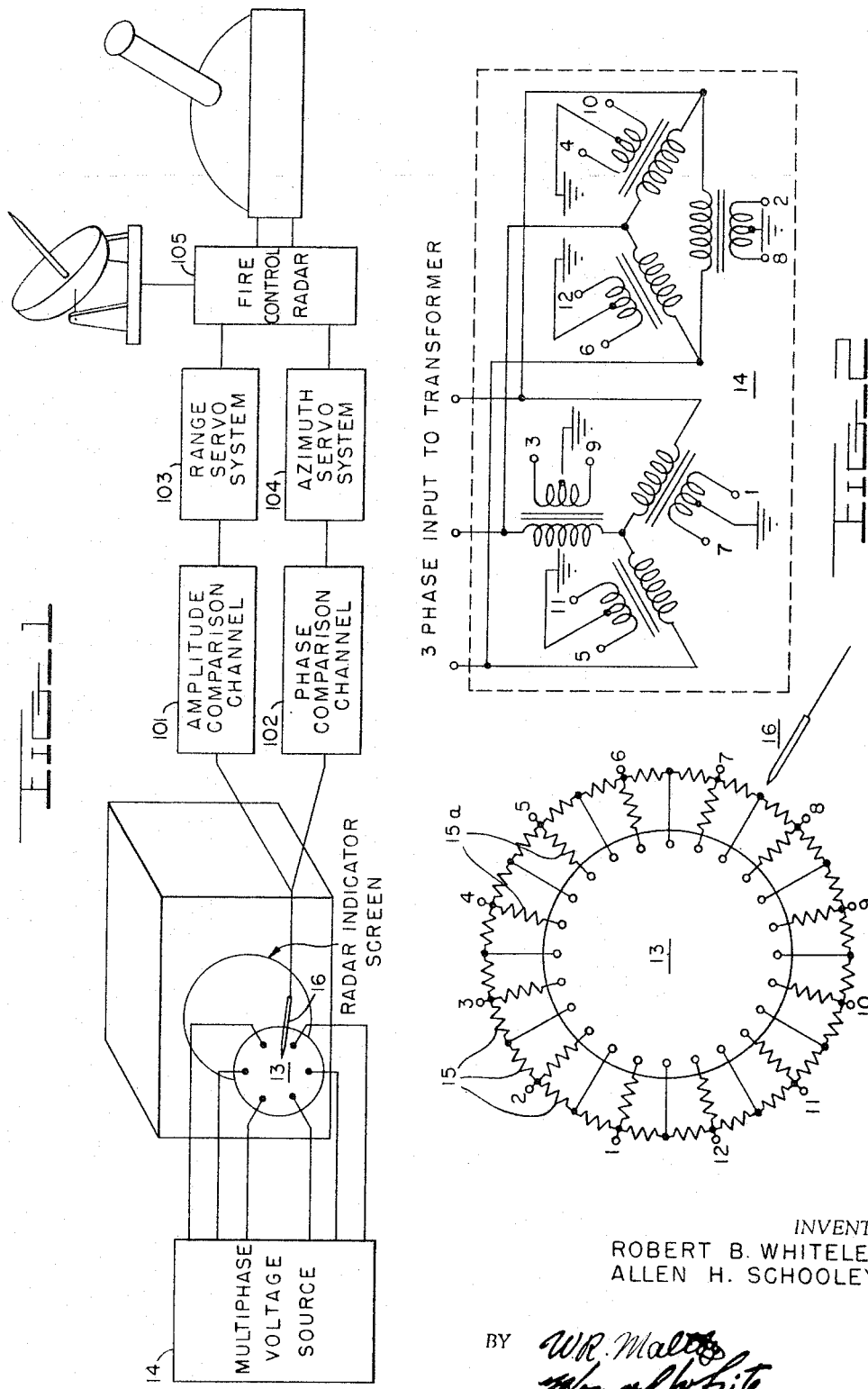

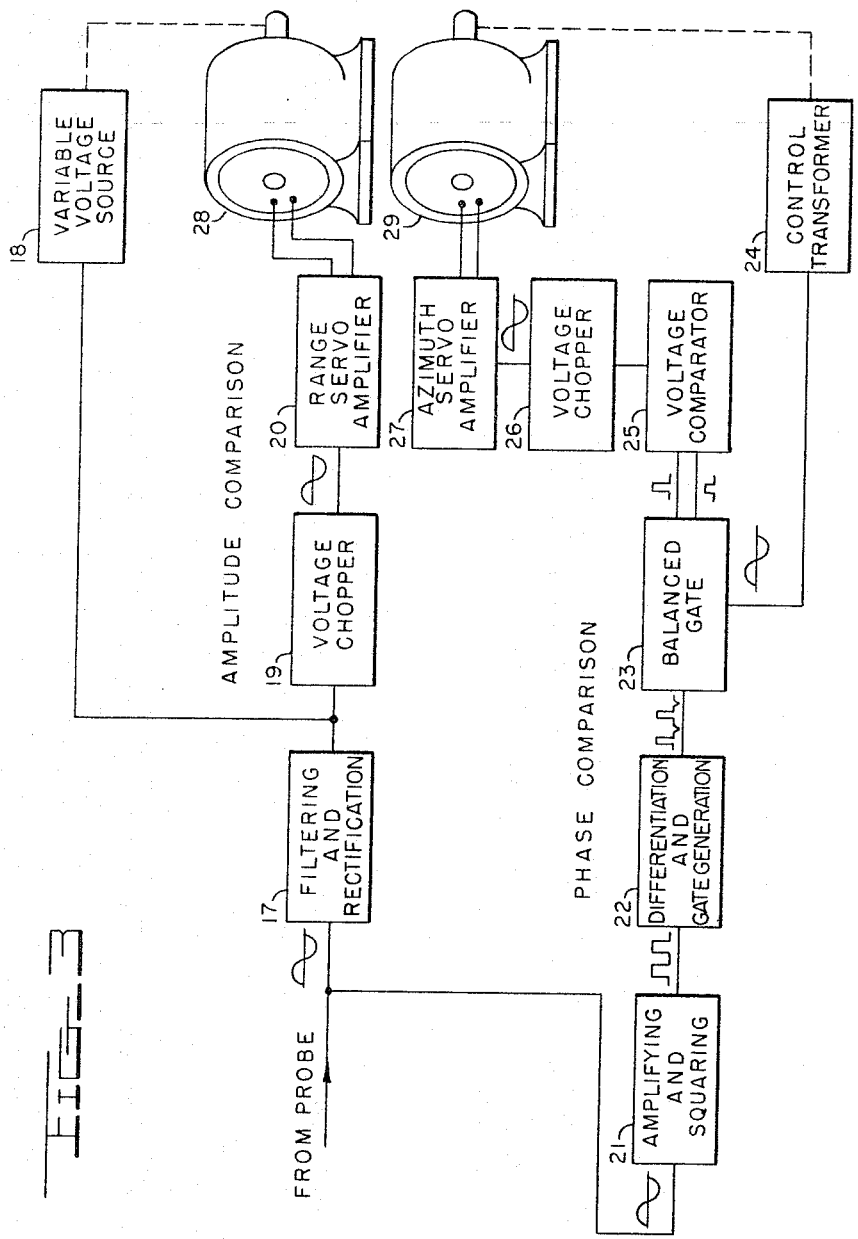

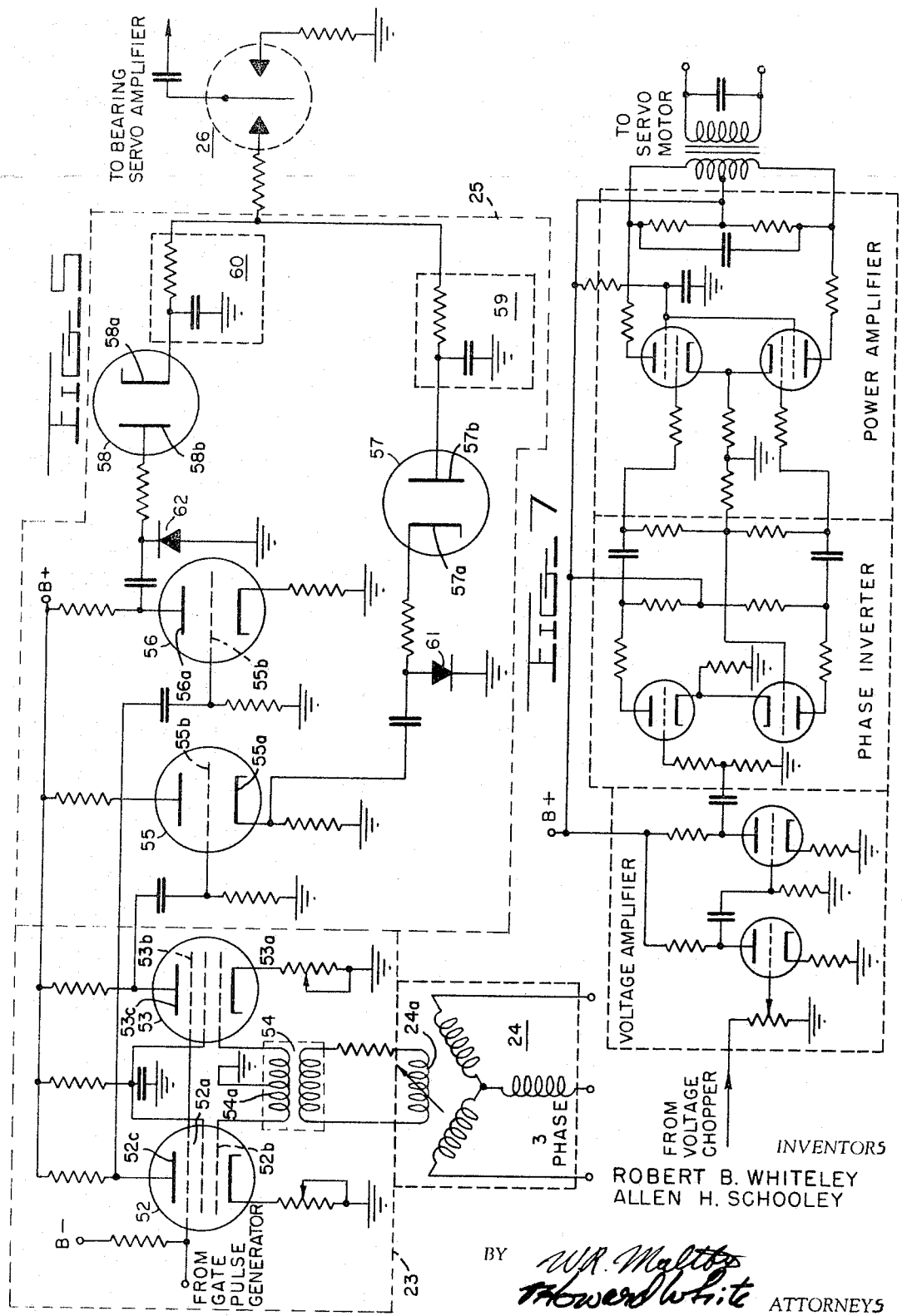

_United States Patent Office_

3,320,503
Patented May 16, 1967

3,320,503
RADIAL RESISTIVE POLAR COORDINATE DATA TAKEOFF TRANSMITTER FOR A SERVO CONTROL
Allen H. Schooley, Washington, D.C. (6113 Cloud Drive, Springfield, Va. 22150), and Robert Bennett Whiteley, Washington, D.C. (25 Cascade Drive, Sunnyvale, Calif. 94087)
Filed May 11, 1955, Ser. No. 507,751
11 Claims. (Cl. 318—25)

The invention described herein may be manufactured and used by or for the Government of the United States of America for governmental purposes without the payment of any royalties thereon or therefor.

This invention relates in general to target designation systems and in particular to an electrical system for transferring range and azimuth voltage information from a radar indicator to appropriate servo systems for the control of remote tracking devices.

Modern target designation systems generally require the transfer of space coordinate information for a selected target from a radar screen to remote tracking devices through a human operator who uses a ruled overlay or other geometrical means to estimate position information and then relays this information via conventional communication means. Although human operators may be trained to rapidly read and interpret space coordinate information and to relay such information with reasonable speed it is apparent that such systems inherently introduce undesirable delay. In addition, it is recognized that any reduction of this delay by an increase in operator speed may generally be accomplished only with the sacrifice of operator's accuracy. With the advent of faster moving targets considerable effort has been expended to determine a comparably faster operating target designation system which substantially reduces or preferably eliminates the increasingly intolerable operator delay.

It is an object of this invention to provide a target designation system which permits the direct transfer of accurate range and azimuth voltage information from a radar indicator to remote tracking devices.

It is another object of this invention to provide a target designation system in which the accuracy of the information is substantially independent of the speed of transfer of said information.

It is also an object of this invention to provide a target designation system which may employ substantially unskilled operators in the determination of space coordinate information for transfer to remote tracking devices.

It is still another object of this invention to provide means for energizing a transparent resistive surface which is mountable before a radar indicator whereby the amplitude and phase of a voltage at any point on said surface is representative of the range and azimuth of an indicated target at a similar point on said radar indicator.

It is a further object of this invention to provide a target designation system in which the amplitude and phase of an electrical signal, representing the range and azimuth of a particular target, may be independently determined and transferred to a remote tracking device.

Other objects of this invention will become apparent from a better understanding of the invention for which reference is had to the accompanying specification and drawings.

FIG. 1 depicts a physical layout of the invention in an operating system.

FIG. 2 is a schematic drawing of the resistive surface and the energization means therefor in a preferred embodiment.

FIG. 3 is a block diagram of the amplitude comparison and phase comparison means of the embodiment shown in FIG. 1.

FIG. 4 is a schematic diagram of the amplifying and squaring circuits plus the differentiation and gate generation circuits of the embodiment shown in block diagram in FIG. 3.

FIG. 5 is a schematic diagram of the balanced gate and peak detector circuits of the embodiment shown in block diagram in FIG. 3.

FIG. 6 is a schematic diagram of the amplitude comparison means of the embodiment shown in block diagram in FIG. 3.

FIG. 7 is a schematic diagram of the servo amplifier means of the embodiment shown in block diagram in FIG. 3.

Briefly this invention utilizes a transparent resistive surface of the type found in several modern teleautograph systems, as a plotting surface in a display data transfer system. In this invention, the surface is adapted to overlay the indicator of a plan position radar and is especially energized from a multi-phase A.C. voltage source to produce a radial field distribution on the surface. By this means of energization the amplitude of the voltage at any point on the surface is proportional to the radial displacement of the point from the center and the phase is representative of the angular displacement of the point relative to a reference direction. More particularly, the resistive surface in the preferred embodiment is energized at a plurality of equi-distant and equally spaced points about the center so that each successive point has a uniformly different phase of energization and any two diametric points are energized in phase opposition. By this means of energization a minimum potential at the center and a linear voltage gradient in all directions therefrom is established on the surface. Thus, in this invention the position of a target on the indicator may be converted into a representative electrical signal of particular amplitude and phase by contacting said surface with a conductive probe at the point on the surface where the target appears. In the invention means are provided for the transfer of voltage information by amplitude and phase comparison circuits to a pair of servo systems. These comparison circuits provide for the isolation of the amplitude and the phase components of said signal as well as the conversion of said components into a usable form for the operation of the pair of servo systems. Thence, said servo systems may be advantageously employed, for example, in a fire control radar station to control the range and azimuth in a remote tracking gun mount or other positionable device.

Referring now to the drawings:

In the basic showing of the invention in an operating system, FIGURE 1, the transparent resistive plotting surface is indicated at 13. This surface may comprise a thin metallic film or oxide on a glass base which is generally referred to as a conducting glass, commercially termed "Nesa" or "Electrapane" glass, or alternatively, it may comprise a transparent resistive coating applied directly to the face of the cathode ray indicator of the radar system. In this embodiment the conducting glass is used and preferably it has a circular configuration to permit the convenient superimposition of the glass directly over the face of the cathode ray tube indicator as shown in the drawings. In either alternative, the effective diameter of the resistive surface 13 is approximately equal to the diameter of the indicating area on the radar indicator to permit a plotting of the entire indicating area.

The energization of surface 13 is accomplished by the application of an alternating voltage of uniformly different phase to each of a plurality of equi-spaced points about the periphery of the disc. In the drawing multiphase voltage source 14 is connected in the to be described manner to the resistive surface 13. It will be noted that in the embodiment of FIG. 1 a plurality of six peripheral points has been selected. It should be understood, however, that dependent on the degree of field uniformity on the surface which the particular application requires, a greater or lesser number of points is within the purview of this disclosure. A conductive probe 16 is provided to pick off from the surface 13 a voltage having a particular magnitude and a particular phase, characteristics of the range and of the azimuth, respectively, of the target to be designated on the indicator screen. This probe is adapted to be manually moved to any point of contact on the surface 13. As shown, the output of the probe is electrically connected in parallel to an amplitude comparison channel 101 and to a phase comparison channel 102 and these in turn are each connected to separate range and azimuth servo systems 103 and 104, respectively which are both connected to a fire control radar 105 to control the positioning of the gun mount.

The preferred means for energizing the resistive surface 13, shown in FIG. 2, depicts a surface having a plurality of 24 peripheral points. It will be appreciated that were a 24 phase voltage source available, this voltage source might be directly connected to the 24 peripheral points of the resistive surface in FIG. 2 in the manner shown in FIG. 1. However, in the interest of a more elaborate disclosure of the invention, a twelve phase voltage source 14 and a suitable voltage distribution network for energizing the resistive surface 13 has been shown and will be described.

In FIG. 2 the transformer network 14 divides a typical three phase voltage source, of power line frequency for example, into a twelve phase voltage source and is shown with terminals numbered for connection to the terminals of a correspondingly numbered voltage division network, to afford the desired 24 phase energization of the surface 13. In detail, transformer network 14 comprises a delta connected transformer circuit and a Y connected circuit, each connected in parallel to the three phase voltage source. The delta connected circuit is made up of three separate transformers, each of which has a split phase (grounded center tap) secondary winding, with the primary windings joined together and connected at the junction points to the three phase source in typical delta circuit fashion. Since the voltages across each half of the secondary winding of each of the transformers are in phase opposition to one another, and further since the phases of the primary windings are in phase with the respective phases of the three phase energization source, the secondaries of the delta connected transformer circuit provide six voltage components in 60° phase relation. Similarly, the Y connected transformer circuit is made up of three identical transformers, each of which has a split phase secondary winding, with the primary windings connected in Y circuit fashion to the three phase source. In the illustrated embodiment, it is essential that each output in both of the delta and Y sections of the transformer 14 have the same magnitude. Consequently, with the exception of a necessary difference in turns ratio between the delta and Y transformers, each transformer in the delta and Y circuit is similar. The three phase voltages exciting the primaries in the balanced Y connected circuit differ from the respective phases of the three phase source by 30°. Hence the Y connected transformer circuit also provides six voltage components in 60° phase relation to one another and in 30° phase relation to the corresponding output components of the delta connected transformer circuit.

The voltage distribution network which connects the delta-Y transformer 14 just described to the resistive surface 13 constitutes, in part, 24 equal valued resistances, indicated at 15, serially connected in a closed loop with alternate junction points along the closed loop consecutively numbered 1 to 12. Said numbered junction points form the voltage input connection to the network to which the correspondingly numbered output terminals of the transformer 14 are connected. The said junction points are connected to said resistive surface by twelve additional similarly equal valued resistances, indicated at 15a, while the intermediary junction points in the closed loop are directly connected to said resistive surface. By this arrangement of resistances a voltage of similar magnitude is applied to each respective pair of diametrically opposite contact points of the resistive surface and each peripheral point on the surface is in 15° phase relation with respect to its next adjacent peripheral point. The described connection operates to place the center of surface 13 at electrical ground and any other point on the surface at a potential having a magnitude proportional to the radial displacement of the point relative to the center of the surface and at a phase which varies in accordance with the angle of the point relative to a reference direction on the surface. An electrically conductive probe 16 has been provided to pick off the voltage at any point.

The output of the conductive probe 16 is electrically connected in parallel to an amplitude comparison channel 101 and a phase comparison channel 102 both shown in a more detailed block diagram in FIG. 3. In operation, the amplitude comparison channel 101 is employed to sense the amplitude of the output voltage of probe 16 and to angularly position the shaft of a range servo motor 28 in accordance therewith, while the phase comparison channel 102 is employed to sense the phase of the output voltage from probe 16 and to angularly position the shaft of an azimuth servo motor 29 in accordance with the phase parameter of the output voltage of probe 16. In FIGURE 3 simple waveforms are depicted to show the input and output waveforms associated with the several circuits in the block diagram.

In the exemplified phase comparison channel 102, shown in more specific detail in FIGURES 4 and 5, the probe 16 is connected by amplifying and squaring means 21 and differentiation and gate generation means 22 to a balanced gate circuit 23 by means of which the phase of the probe voltage may be compared with the phase of a voltage from a control transformer 24. The phase of the control transformer voltage is representative of the position of the azimuth servo motor 29 and, as will be further discussed, at the start of the operation is also representative of the reference direction of the last detected signal. As shown in FIGURE 3, the output of the balanced gate which is proportional to the difference in phase between the probe voltage and the control transformer voltage, is directly connected through voltage comparator means 25 to the azimuth servo amplifier 27 to operate the servo motor 29.

More specifically, referring now to FIGURE 4, the probe 16 is connected by a current limiting resistance 41 to the grid of a D.C. amplifier 42, the output of which for a given sine wave input from the probe 16 is a square wave signal of increased amplitude. It will be seen that the square wave output of the amplifier 42 more definitely establishes the cross-over point or leading edge of the input signal and substantially eliminates any dependency on the amplitude of the probe voltage. The output of the amplifier 42 is coupled to the input of a Schmitt trigger circuit which has two stable states and comprises two pentodes 43 and 44, type 6AG5 or the equivalent, properly interconnected and operable in the normal manner. It is the purpose of said trigger circuit to more definitely establish the cross-over point or leading edge of the input signal. In operational synopsis, tube 43 is normally non-conducting while tube 44 conducts. When the D.C. level of the voltage on the input grid of tube 43 reaches a critical value, as determined by the bias, tube 43 conducts and tube 44 becomes non-conducting. When the input grid on tube 43 drops below the critical value, tube 43 becomes non-conducting and tube 44 conducts again.

The output of the means 21, which includes the above described amplifier and trigger circuit as indicated by the dashed lines in FIG. 4, is connected to a differentiating circuit, condenser 45 and resistnce 46. This differentiating circuit which preserves the leading edge of the square wave but dissipates the rest of the wave, is connected to the grid of another amplifier 47 which drives a one-shot multivibrator comprising the twin triodes 48 and 49, which may be a type 6J6 or the equivalent. To fire said multivibrator on only negative pulses of the differentiated wave, a unidirectional element 50 is connected to the grid of the amplifier 47. Said unidirectional element expressly provides a direct current path to ground for all positive pulses of the differentiated wave. The multivibrators 48, 49 in the means 22 provides a square positive pulse whose width is adjustable by means of a potentiometer 51 connected between the grid of the second triode 49 and B+. In the described embodiment, for reasons which shall become apparent upon further consideration of the invention, the width of the pulse in the output of the multivibrator is set such that it occupies no more than five percent of one cycle of the signal. As indicated by the dashed lines in FIG. 4, the differentiating circuits 45, 46, the amplifier 47 and the multivibrators 48, 49 together constitute the differentiation and gate generation means 22 shown in block diagram in FIG. 3. As previously described, the positive pulse output of the means 22 is one of the two inputs to the balanced gate 23.

Referring now to FIGURE 5, the balanced gate 23 is shown as a gated balanced modulator comprising two pentodes 52, 53 which may be, by way of example, type 6BN6 or the equivalent. In each of said pentodes 52, 53 an alternating bias voltage 180° out of phase with the other is applied to a first control grid 52a and 52b, respectively by connection to the rotor winding 24a of the three phase control transformer 24 through opposite ends of the grounded center tap winding 54a of transformer 54. As previously described, said alternating bias voltage is a sine wave of determined amplitude whose phase varies in accordance with the position of the transformer 24 rotor winding. A negative bias voltage is applied to a second control grid 52b and 53b in said pentodes 52, 53, respectively, to maintain both tubes non-conducting or almost non-conducting under static conditions. When a positive gating pulse from the described multivibrator is applied to said second control grid in tubes 52 and 53, the applied pulse will be aided by a positive voltage on the first control grid in one tube and opposed by a negative voltage on the first control grid in the other tube and it follows that the first of said tubes will have a greater conduction than the other tube during the interval of the pulse. Thus the output taken at the plates 52c and 53c of the tubes 52 and 53, respectively, will differ in pulse height proportional to the magnitude of the positive signal on the first control grid of tube 52 or 53 as the case may be.

As previously described, the output of the balanced gate 23 feeds a voltage comparator 25, both circuits being indicated by dashed lines in FIG. 5. To provide the voltage comparison, the outputs of the two pentodes 52 and 53 in the balanced gate are applied to the grids 55b, 56b of amplifiers 55 and 56 respectively. By taking the output of amplifier 55 at the cathode 55a and the output of the amplifier 56 at the plate 56c, pulses of opposite polarity are obtained. As shown in FIGURE 5, the inverted pulse outputs of tubes 55 and 56 are separately coupled to a peak detection circuit comprising two diodes 57 and 58 and R.C. circuits 59 and 60, connected to the plate 57b of diode 57 and to the cathode 58a of diode 58, respectively, to develope a direct current difference voltage proportional to the difference in magnitude of the balanced gate outputs. Unidirectional elements 61 and 62 are connected to the cathode 57a of 57 and the plate 58b of 58, respectively, to clamp the input to each of the detector diodes and permit rapid recovery of the R.C. charging circuits.

Said R.C. charging circuits 59 and 60 have a common discharge path through the vibrator or voltage chopper means 26. The DPST vibrator means 26, which may be one half a Stevens-Arnold Chopper No. 258 or the equivalent, converts the significant D.C. voltage just developed into a significant square wave alternating voltage for input to the A.C. servo system which comprises servo amplitude 27 and servo motor 29.

The servo motor 29 is mechanically connected to control the azimuth in a remote tracking device, for example the fire control radar antenna or the gun mount itself, and is also connected through synchronous means, or by direct means as shown in FIGURE 3, to vary the rotor of control transformer 24. Since, as previously described, said transformer 24 supplies an alternating bias to the first control grid in each of the pentodes 52 and 53, which increases the output in one or the other of said pentodes depending on its relative phase with respect to the pulse signal time coincidentally applied to the second control grid in each of the pentodes, as the motor moves the tracking device and varies the rotor position, the phase of the alternating voltage will also change until the crossover point of this alternating voltage coincides with the narrow pulse. Thereupon the tracking device will be trained on the target, no amplitude difference between output pulses of the balanced gate will be apparent, and the servo system will stop.

Also, in further consideration of the balanced gate circuitry, the width of the input pulse to the balanced gate should occupy no more than five percent of one cycle of the probe signal voltage. It is important that the pulse be wide enough to permit a balanced gate output voltage of reasonable magnitude, sufficient to drive the servo amplifier. At the same time, the pulse should be as small as possible because only the leading edge of the pulse represents the true phase of the probe voltage and thus the phase error is proportional to pulse width.

In the amplitude comparison channel, as in the phase comparison channel, the input signal voltage is compared with a reference voltage representative of the position of the servo motor. In the amplitude comparison circuit, however, it is desirable that the amplitude of the input signal be independent and completely insensitive to angular displacement, or phase, of the input signal. For this reason the input signal is converted from a representative A.C. signal voltage into a representative D.C. signal voltage before comparison with the reference voltage in this comparison channel.

Referring now to FIGURE 6, the probe 16 is directly connected to a unidirectional element 30, which may be a germanium type 1N34 rectifier or the equivalent, and a resistance 31 and condenser 32 which provide an R.C. charging circuit and in conjunction with the rectifying element 30. As indicated in the drawing said circuitry comprises the filtering and rectification means 17 of FIGURE 3 and serves to provide a rectified output voltage proportional to the amplitude of the A.C. voltage detected by the probe 16. The time constant of the charging circuits 31 and 32 will be determined by the amount of smoothing action desired and the voltage recovery speed required for new probe position on the surface. The so-obtained D.C. voltage is then applied along with a variable D.C. voltage of opposite polarity from source 18 to a voltage chopper 19 whose output is an A.C. voltage representative of the difference between the two input voltages of opposing polarity. As indicated in FIGURE 3 the magnitude of the voltage from variable voltage source 18 is variable in accordance with the rotation of the shaft of servo motor 28. As in the phase comparison channel, the output of the voltage chopper is fed into a servo amplifier, indicated at 20 in FIG. 3, which controls the position of the servo motor 28 to control the range gate mechanism in the fire control radar unit. Similar to the operation of the control transformer 24 in the phase comparison channel, the voltage source 18 acts to cancel out the input to servo amplifier when the range indication to the fire control radar unit coincides with the range of the designated target on the surface 13. Thus as the servo motor operates, it varies the output of the variable voltage source 18 until the magnitude of the source 18 is equal to the magnitude of the rectified probe voltage, whereupon the servo system will stop.

Thus, by the simultaneous operation of the phase comparison channel and the amplitude comparison channel, the remote tracking device will be automatically instructed as to two space coordinates, range and azimuth, of the target designated on the resistive plotting surface.

A servo amplifier suitable for use in either the amplitude comparison or the phase comparison channel of this invention has been shown in FIGURE 7. As this servo amplifier is of conventional design it will not be discussed in particular detail in this application. The servo amplifier shown comprises an input voltage amplifier, a phase inverter, and a push-pull power amplifier stage which, by means of an output transformer, drives a Diehl servo motor type FPE25–11 or the equivalent. To insure that no stray pickup will cause the servo system to rotate, a relay, not shown in the drawings, may be provided which will ground the signal in each servo amplifier when the probe 16 is lifted from the energized surface 13.

As a further refinement of the servo system employed in this invention standard voltage tachometers may be attached to both servo motors providing "derivative" voltages which may be applied to their respective voltage chopper inputs. The purpose of these tachometers is to effect stabilization and to reduce hunting in the servo system. As voltage tachometers are readily incorporated in any servo systems, and represent a non-essential operation of this invention, said tachometers are not shown in the drawings.

Furthermore, it is understood that this invention is not to be limited by the type of resistive surface referred to nor by the specific circuitry shown for the amplitude and phase comparison channels but that comparable surfaces and circuitry may be substituted when desirable. Finally it is understood that this invention is to be limited only by the scope of the claims appended hereto.

What is claimed is:

1. In combination, a substantially uniform resistive surface, a multiphase voltage source, means for applying said voltage source to said resistive surface to develop a radial voltage field thereon, electrically conductive probe means positionable at any point on said surface and means for determining the amplitude and phase of voltage detected by said probe means.

2. In combination, a substantially uniform resistive surface, a multiphase voltage source, voltage applying means for applying said voltage source to said resistive surface to develop a uniform radial field thereon, electrically conductive probe means positionable at any point on said surface, an amplitude sensitive channel, a phase sensitive channel, means connecting said channels to said proble means, and means connected to each of said channels responsive to a movement of said probe means on said resistive surface.

3. In combination, a substantially uniform resistive surface, a multiphase voltage source, a voltage distribution network connected between said voltage source and said resistive surface to develop a uniform radial field thereon, electrically conductive probe means positionable at any point on said surface, an amplitude sensitive channel, a phase sensitive channel, means connecting said channels to said probe means, and means connected to each of said channels responsive to a movement of said probe means on said resistive surface.

4. In combination, a substantially uniform uniform resistive surface, a multiphase voltage source, a voltage distribution network for applying said multiphase voltage source to said resistive surface to develop a radial voltage field thereon, electrically conductive probe means positionable at any point on said surface for detecting a voltage thereon, a first reference voltage source for providing a voltage of variable magnitude, first voltage comparison means for comparing the voltage detected by said probe means on said resistive surface with the output of said first reference voltage source, means for varying the magnitude of the voltage output of said first reference voltage source in accordance with the output of said first comparison means, a second reference voltage source for providing a voltage of variable phase, second voltage comparison means for comparing the voltage detected by said probe means on said resistive surface with the output of said second reference voltage source, and means for varying the phase of the voltage output of said second reference voltage source in accordance with the output of said second comparison means.

5. In combination, a substantially uniform resistive surface, a multiphase voltage source, a voltage distribution network for applying said multiphase voltage source to said resistive surface to develop a radial voltage field thereon, electrically conductive probe means positionable at any point on said surface for detecting a voltage thereon, a first reference voltage source for providing a voltage of variable magnitude, first voltage comparison means for comparing the voltage detected by said probe means on said resistive surface with the output of said first reference voltage source, means for varying the magnitude of the voltage output of said first reference voltage source in accordance with the output of said first comparison means, a second reference voltage source for providing a voltage of variable phase, second voltage comparison means for comparing the voltage detected by said probe means on said resistive surface with the output of said second reference voltage source, and means for isolating the amplitude characteristic and the phase characteristic of said detected voltage one from the other.

6. In combination, a substantially uniform resistive surface, a multiphase voltage source, a voltage distribution network for applying said multiphase voltage source to said resistive surface to develop a radial voltage field thereon, electrically conductive probe means positionable at any point on said surface for detecting a voltage thereon, a first reference voltage source for providing a voltage of variable magnitude, first voltage comparison means for comparing the voltage detected by said probe means on said resistive surface with the output of said first reference voltage source, means for varying the magnitude of the voltage output of said first reference voltage source in accordance with the output of said first comparison means, means for producing a gating pulse in accordance with the phase of the voltage detected by said probe means, a control transformer for providing an alternating voltage of variable phase, a balanced modulator means for comparing the phase of the voltage detected by said probe means with the phase of the output voltage of said control transformer, and means for varying the phase of the voltage output of said control transformer in accordance with the output of said balanced modulator means.

7. In combination, a substantially uniform resistive surface, a multiphase voltage source, means for applying said voltage source to said resistive surface to develop a radial field thereon, voltage sensitive probe means for detecting the voltage at any point on said resistive surface, and means for determining the amplitude and phase of voltage detected by said probe means.

8. In combination, a substantially uniform resistive surface, a multiphase voltage source, a voltage distribution network connected between said voltage source and said resistive surface to develop a uniform radial field thereon, voltage sensitive probe means for detecting the voltage at any point on said resistive surface, an amplitude sensitive channel, a phase sensitive channel, means connecting said channels to said probe means, and means connected to each of said channels responsive to a deviation in the voltage information output thereof, respectively.

9. In combination, a substantially uniform resistive surface, a multiphase voltage source, a voltage distribution network for applying said multiphase voltage source to said resistive surface to develop a radial voltage field thereon, voltage sensitive probe means for detecting the voltage at any point on said resistive surface, a first reference voltage source for providing a voltage of variable magnitude, first voltage comparison means for comparing the voltage detected by said probe means at any point on said resistive surface with the output of said first reference voltage source, means for varying the magnitude of the voltage output of said first reference voltage source in accordance with the output of said first comparison means, a second reference voltage source for providing a voltage phase, second voltage comparison means for comparing the voltage detected by said probe means at any point on said resistive surface with the output of said second reference voltage source, and means for varying the phase of the voltage output of said second reference voltage source in accordance with the output of said second comparison means.

10. In combination, a substantially uniform resistive surface, a multiphase voltage source, a voltage distribution network for applying said multiphase voltage to said resistive surface to develop a radial voltage field thereon, voltage sensitive probe means for detecting the voltage at any point on said resistive surface, a first reference voltage source for providing a voltage of variable magnitude, first voltage comparison means for comparing the voltage detected by said probe means at any point on said resistive surface with the output of said first reference voltage source, means for varying the magnitude of the voltage output of said first reference voltage source in accordance with the output of said first comparison means, a second reference voltage source for providing a voltage of variable phase, second voltage comparison means for comparing the voltage detected by said probe means at any point on said resistive surface with the output of said second reference voltage source, and means for isolating the amplitude characteristic and the phase characteristic of said detected voltage one from the other.

11. In combination, a substantially uniform resistive surface, a multiphase voltage source, a voltage distribution network for applying said multiphase voltage source of said resistive surface to develop a radial voltage field thereon, voltage sensitive probe means for detecting the voltage at any point on said resistive surface, a first reference voltage source for providing a voltage of variable magnitude, first voltage comparison means for comparing the voltage detected by said probe means at any point on said resistive surface with the output of said first reference voltage source, means for varying the magnitude of the voltage output of said first reference voltage source in accordance with the output of said first comparison means, means for producing a gating pulse in accordance with the phase of the voltage detected by said probe means, a control transformer for providing an alternating voltage of variable phase, a balanced modulator means for comparing the phase of the voltage detected by said probe means with the phase of the output voltage of said control transformer, and means for varying the phase of the voltage output of said control transformer in accordance with the output of said balanced modulator means.

References Cited by the Examiner
UNITED STATES PATENTS

| | | | |
|---|---|---|---|
| 2,445,213 | 7/1948 | Evans | 343—7.4 |
| 2,455,963 | 12/1948 | Wheeler | 340—177 |

ORIS L. RADER, *Primary Examiner.*

CHESTER L. JUSTUS, *Examiner.*

T. LYNCH, *Assistant Examiner.*